United States Patent [19]
Jamison et al.

[11] 3,957,076
[45] May 18, 1976

[54] MONORAIL TRANSPORTATION SYSTEM

[75] Inventors: Will B. Jamison, Bethel Park; Eston F. Petry, McMurray, both of Pa.

[73] Assignee: Consolidation Coal Company, Pittsburgh, Pa.

[22] Filed: Apr. 18, 1974

[21] Appl. No.: 462,154

[52] U.S. Cl............................ 137/344; 137/355.17
[51] Int. Cl.² ................. H02G 11/00; B65G 53/30
[58] Field of Search........... 137/344, 355.16, 355.17

[56]  References Cited
UNITED STATES PATENTS
2,803,498   8/1957   Touton .............................. 137/344

*Primary Examiner*—Henry T. Klinksiek
*Attorney, Agent, or Firm*—William J. Miller

[57] ABSTRACT

A transfer conveyer for a monorail-supported slurry transportation system has a bottom frame which is formed through a 180° arc. An input ramp and an output ramp and rollers are radially journaled along the bottom frame. The side frames are constructed around the bottom frame, and a plurality of rollers is journaled in the side frame. A transport system is attached to the frames, and an apparatus is attached between the transport system and the frame to change the angle of the bottom frame with respect to the horizon. The input and output ramps are also pivotally attached to the frame in order that they may be swung horizontally with respect to the frame to properly align the input and output ramps with the overhead monorail transportation system.

2 Claims, 3 Drawing Figures

MONORAIL TRANSPORTATION SYSTEM

BRIEF DESCRIPTION OF THE PRIOR ART

Prior art relating to the conveyer system is set out in an application entitled "Conveyer for Slurry Hose Transportation System," Ser. No. 389,271, filed Aug. 21, 1973, now U.S. Pat. No. 3,868,964, by J. H. Tarter, R. G. Reed, V. Colussi, and David L. McCain. A U.S. Pat., No. 3,260,548, issued to E. H. Reichl, entitled "Method and Apparatus for Continuously Mining and Transporting Coal," also relates to the above system.

BRIEF DESCRIPTION OF THE INVENTION

In the above-described application, a conveyer for a slurry hose transportation system is disclosed which has a plurality of wheel-supported carts and a linkage system interconnecting the carts. The conveyer provides means for transporting the carts and slurry system through a 180° turn by lifting the wheels of the cart from engagement with the ground and directing the linkage during the 180° turn. In one form, the linkage is restrained to a particular geometry so that the hose will maintain a predetermined minimum arc. The conveyer system in the application includes a bottom frame having a plurality of radially-journaled rollers mounted in the bottom frame and a transportation system for moving the conveyer.

The prior art conveyer system while having radial rollers on a bottom frame which is formed into a 180° loop does operate with a wheel-supported slurry system. It is incapable of operating with an overhead monorail system, since no carts are used to transport the hose, but rather the hose itself must be conveyed through the 180° arc; therefore, the conveyer must be adapted to move the hose through the arc without damage to the hose and provide a means for reconnecting the hose to the new monorail once the hose has been transported around the 180° loop. Since the monorail may not be perfectly parallel due to contortions or configurations in the mine roof or movement subsequent to the installation of the monorail in the mine roof, the input and output of the conveyer has pivotal ramps attached thereto to provide some tolerance in the overhead location of the monorail system. Also, since the height of the monorail system may vary with respect to the floor of the mine, a lift system must be provided for the conveyer to accommodate changes in the height of the mine roof as the transport system moves the conveyer along the floor of the mine.

DETAILED DESCRIPTION OF THE FIGURES

Similar numbers will be used throughout the specification for similar elements.

Figure 1:
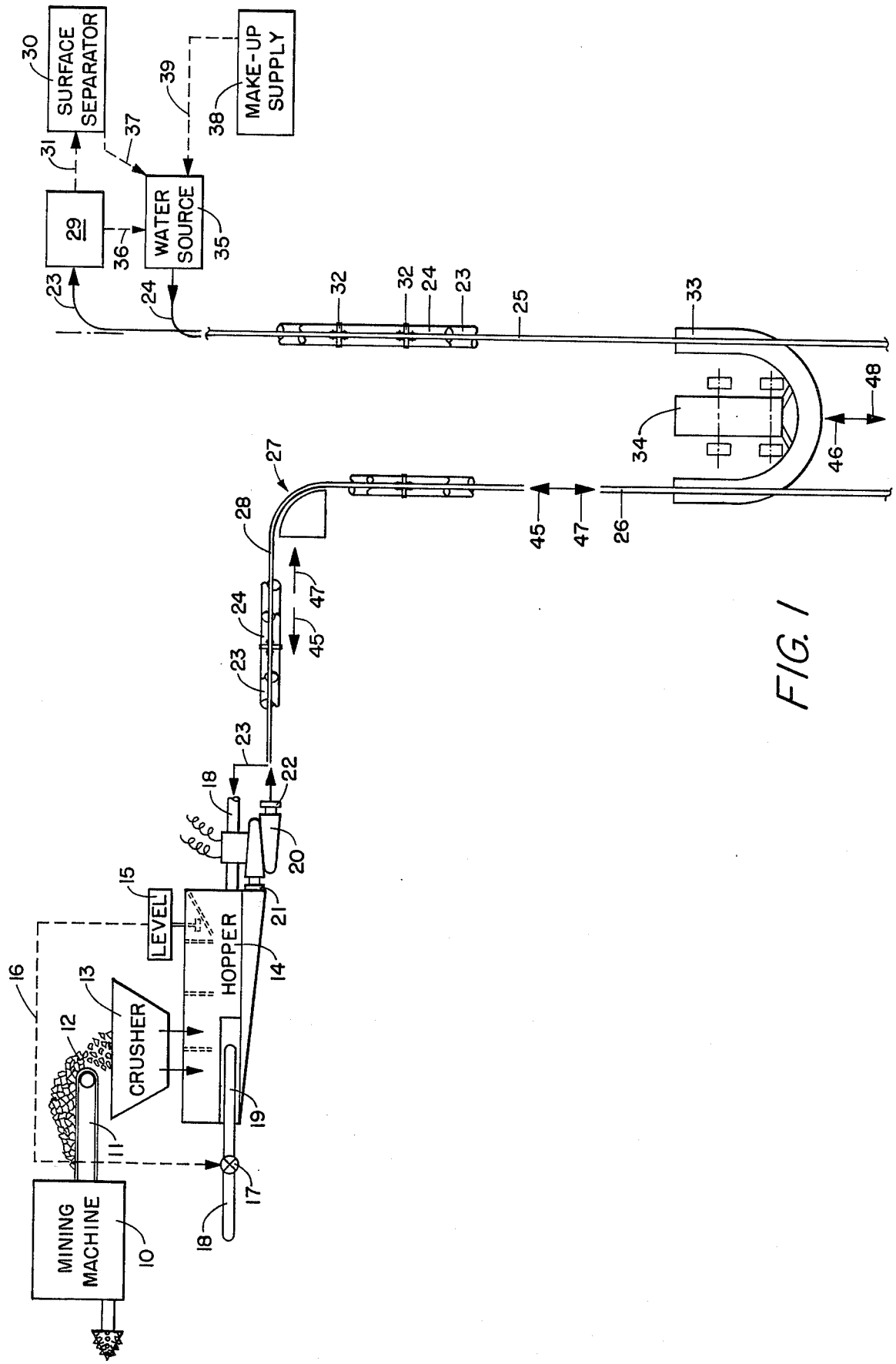
FIG. 1 is a schematic layout of a slurry hose transportation system.

Referring to all of the drawings, but in particular to FIG. 1, a mine digging machine 10 has the product loosened by machine 10 and picked up by a conveyer 11. The product 12 is dropped or conveyed into a crusher 13, which may be any usual type crusher such as a roll crusher or jaw crusher, and may include means for separating the material that does not need to be crushed and crushing only the larger material. Crushers are well known and will not be further discussed. The material from the crusher is dropped into a hopper 14 which contains water. A water level control 15 applies a continuous signal through line 16 to a valve 17 which is connected to a water line 18. Water line 19 is connected to valve 17 and through a plurality of slots (not shown) communicating with the interior of the hopper. The hopper illustrated herein is for the purposes of assisting in the understanding of the invention and is the subject matter of a patent application entitled "Slurry Hopper System," Ser. No. 389,273, filed Aug. 21, 1973, now abandoned, and is copending with this application.

A slurry pump 20 has its inlet connected to the outlet 21 of hopper 14. Slurry pump 20 has an outlet 22 connected to a slurry hose 23. Water hose 24 is connected to water line 18. Both hoses 23 and 24 are supported by a slurry transportation system which essentially comprises a fixed monorail 25 mounted into the roof of the mine and near one side of the tunnel. A second monorail 26 is mounted in the roof parallel to monorail 25 and near the opposite side of the tunnel. Connected to monorail 26 is one or more 90° turns 27 and extensions 28. Hoses 23 and 24 are strapped together by bands 32 which are spaced along the pair of hoses by an amount sufficient to support the hose without undue droop or overstressing of the support system.

Attached to each of the bands 32 is a roller support mechanism (not shown but to be later described). A conveyer 33 is attached to transfer the hoses 23 and 24 from monorail 25 to monorail 26. Conveyer 33 is powered by a vehicle 34 which may be of any usual type operated by electricity, diesel fuel, or other acceptable means. The termination of water hose 24 is connected to a water source 35. Hose 23 terminates at a remote terminal 29 which connects to a surface separator 30 through a pipeline 31. The excess water from terminal 29 can be fed through a pipe 36 to water source 35 and the excess water from the surface separator 30 can likewise be fed through a pipe 37 to water source 35. Some water will be lost in the process or the demand for water may vary. A makeup supply 38 connects through a pipe 39 to water source 35. Operation of the overall system as illustrated in FIG. 1 operates in the following manner:

As the mining machine 10 removes product 12, it is carried up by conveyer 11 and passed to crusher 13 where it is deposited in hopper 14. Pump 20 pulls the slurry mixture from the hopper and passes it into line 23 where it is eventually received at a remote terminal 29, pumped to the surface through pipeline 31, and separated by separator 30. As mining machine 10 works in and out of the coal seam, the slurry hose must follow these movements. Machine 10 removes product 12 such as coal. The hoses being operated on monorails 25, 26, 27, and 28 are free to move as the mining machine moves. Thus, as the mining machine moves in a forward direction into the coal seam, the hoses 23 and 24 must move in the direction of arrow 45. Movement of the slurry system in the direction of arrow 45 requires an additional length of hose to be transferred from monorail 25 to monorail 26. To effect this transfer, conveyer 33, which is powered by vehicle 34, moves in the direction of arrow 46. When the mining machine must move out of the seam, less hose is needed on monorails 26, 27, and 28, and thus some must be retransferred to monorail 25. As the hoses move in the direction of arrow 47, conveyer 33 must move in the direction of arrow 48.

Figure 2:
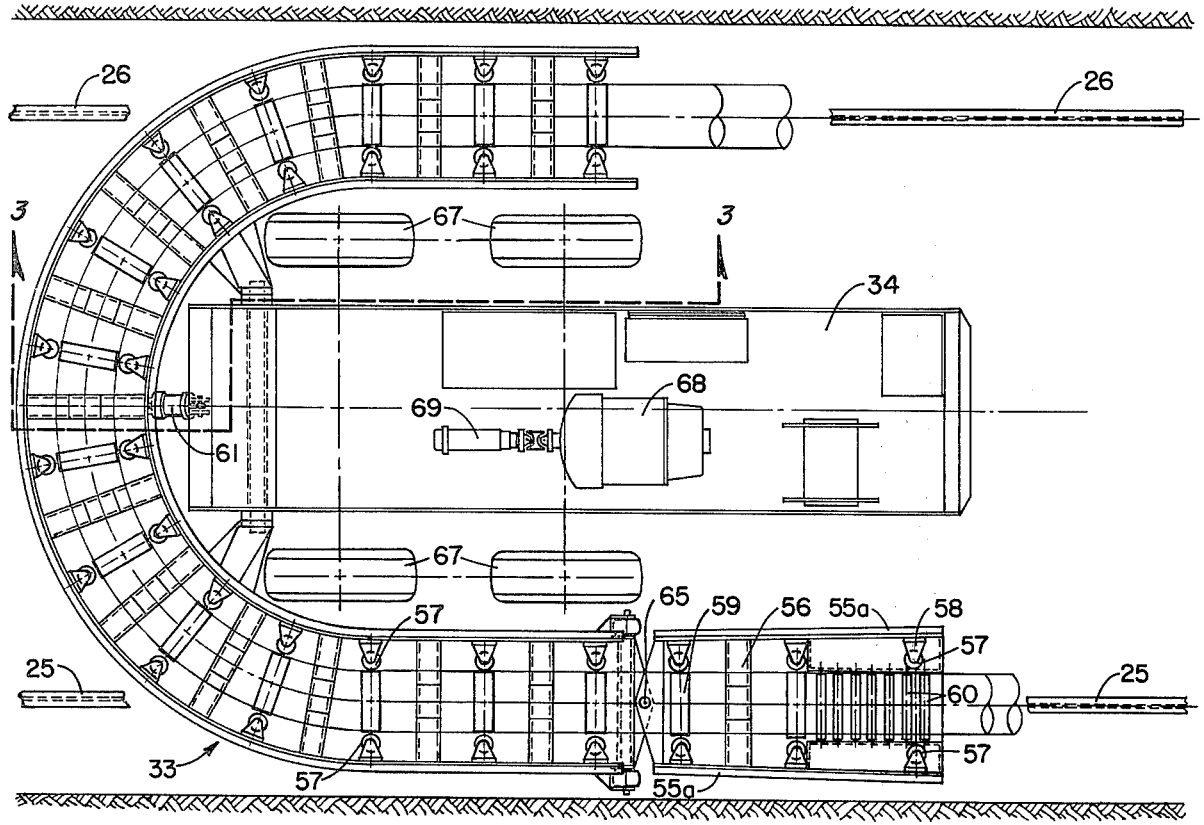
FIG. 2 is the top view of a 180° conveyer used in a monorail slurry transportation system.
Figure 3:
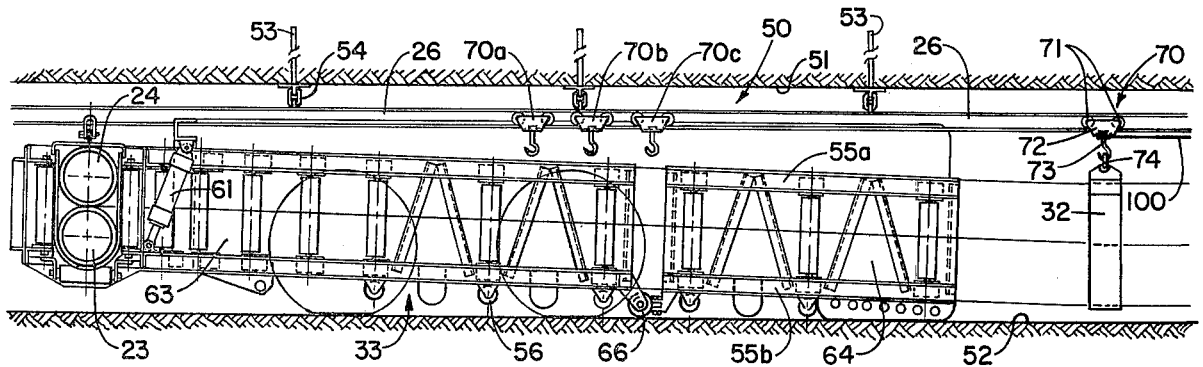
FIG. 3 is a side view of FIG. 2 taken through lines 3—3.

Referring to FIGS. 2 and 3, conveyer 33 is illustrated along with monorails 25 and 26. A mine tunnel, generally referred to by the number 50, has a roof 51 and a floor 52. Monorails 25 and 26 are attached to the roof 51 of mine tunnel 50 by means of roof bolts 53. Roof bolts 53 are driven into the roof 51 by any usual means and tightened or secured. A linkage 54 is then attached between monorail 26 and roof bolt 53. Linkage 54 should be adjustable in order to accommodate the variances in the roof profile. Other systems, of course, can be used in lieu of linkage, for example, bolts, in order to accommodate variations in the roof profile. Conveyer 33 is pushed in the mine tunnel 50 by vehicle 34 so that it is directly under and aligned with monorails 25 and 26.

Conveyer 33 comprises a plurality of side frame members 55a and 55b. A bottom member 56 connects side members 55b. A plurality of rollers 57 is attached between side frame members 55a and 55b by any usual means such as brackets 58. The spacing between rollers 57 is dimensioned to accommodate the maximum width of the hoses 23 and 24 and brackets 32. A plurality of bottom rollers 59 is journaled between side frame members 55b. A plurality of smaller input and output rollers 60 is mounted between side frame members 55b and used to assist the hoses and frame 32 onto the conveyer. Attached to vehicle 34 is a hydraulic cylinder 61 between bottom member 56 and a top frame 62.

Conveyer 33 is divided into a large section generally referred to by the number 63 and two smaller sections generally referred to by the number 64. Section 64 is connected to section 63 by a pivot 65. A rolling contact 66 is attached to large section 63 and provides rolling contact with the floor 52 of mine hall 50. Additional support is provided by the wheels 67 which are journaled to vehicle 34 and driven by a motor 68. Motor 68 is driven by any usual means such as electricity and such method of driving motor 68 will not be further described since it is well known in the art. Motor 68, however, is coupled to wheels 67 through a driving means such as drive shaft 69.

Hoses 23 and 24 are normally supported on monorails 25 and 26 by means of mobile hooks generally referred to by number 70. Each mobile hook comprises a plurality of support wheels 71, a support frame 72, and a hook 73 which is attached pivotally to support frame 72. Bracket 32 has a C-shaped retaining means 74.

The operation of the 180° conveyer is described in the following manner:

Hoses 24 and 23 are supported by bands 32 through C-shaped retaining means 74 to mobile hooks 70. Mobile hooks 70 are free to roll along monorails 25 or 26. As the conveyer vehicle 34 moves in a manner to transfer hoses 23 and 24 from monorail 26 to monorail 25, for example, the hose enters smaller section 64 and is lifted gradually by the ramp comprising conveyer rollers 59. Once the hose is lifted sufficiently to disconnect hook 73, it is disconnected from C-shaped retaining means 74. The hose is then supported by rollers 56 and 57. As the vehicle 34 moves, the hose will be physically moved around the conveyer to a point where mobile hooks 70 on monorail 25 can be inserted in the C-shaped retaining means 74. As the hose continues to move, hooks 70 will take up the weight of the hose assembly. Spare mobile hooks 70a, 70b, and 70c, for example, are stored on the monorail until they are needed. The incline of the conveyer 33 can be adjusted by hydraulic cylinder 61. The pivot 65 permits movement of smaller section 64 to accommodate any change in spacing between monorails 25 and 26.

CONCLUSIONS

A conveyer system for a monorail slurry hose transportation system has been disclosed which provides for a method of transferring slurry hose from one parallel monorail to another parallel monorail or back during the mining operation in order to accommodate the movement of the mining machine into or out of the coal face. With the angle of the conveyer being adjustable and with the input and output ramps being adjustable, the conveyer is extremely adaptable to variations in the mine floor, variations in the parallel spacing of the monorails, and variation in the eventual position of the monorails with respect to the conveyer as it proceeds down the mine hall.

It is obvious that modifications or changes can be made in the particular configuration of the conveyer as disclosed, and these modifications and changes are clearly intended to fall within the scope of the appended claims.

What we claim is:

1. In a conveyer for transporting a slurry hose means supported from an overhead monorail through a 180° turn wherein said conveyer has a bottom frame means formed through a 180° arc and an input ramp and an output ramp, and first roller means radially journaled along said bottom frame, said conveyer comprising:
   a. first and second side frame means pivotally attached to each side of said bottom frame means to permit said side frame means to swing angularly with respect to the axis of said overhead monorail;
   b. a plurality of second roller means journaled in said first and second side frame means; and
   c. means for changing the distance between said bottom frame first roller means and said overhead monorail.

2. An apparatus as disclosed in claim 1 additionally including a transportation means attached to said conveyer whereby said conveyer can be moved along the length of and under said overhead monorail and wherein said means for changing the distance between said bottom frame first roller means and said overhead monorail comprises a hydraulic piston and means for attaching said hydraulic piston between said transportation system and said bottom frame.

* * * * *